(12) United States Patent
Kayode

(10) Patent No.: US 11,085,291 B2
(45) Date of Patent: Aug. 10, 2021

(54) PERMEABILITY PREDICTION USING A CONNECTED RESERVOIR REGIONS MAP

(71) Applicant: Saudi Arabian Oil Company, Dhahran (SA)

(72) Inventor: Babatope Kayode, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 241 days.

(21) Appl. No.: 16/280,581

(22) Filed: Feb. 20, 2019

(65) Prior Publication Data

US 2019/0257196 A1 Aug. 22, 2019

Related U.S. Application Data

(60) Provisional application No. 62/633,164, filed on Feb. 21, 2018.

(51) Int. Cl.
| | | |
|---|---|---|
| *E21B 49/00* | (2006.01) | |
| *E21B 47/06* | (2012.01) | |
| *E21B 49/02* | (2006.01) | |
| *G01V 9/00* | (2006.01) | |

(Continued)

(52) U.S. Cl.
CPC ............... *E21B 49/00* (2013.01); *E21B 41/00* (2013.01); *E21B 47/00* (2013.01); *E21B 47/06* (2013.01); *E21B 49/02* (2013.01); *G01V 9/00* (2013.01)

(58) Field of Classification Search
CPC .......... E21B 49/00; E21B 41/00; E21B 47/06; E21B 49/02; E21B 43/16; G01V 9/00; G01V 99/005
See application file for complete search history.

(56) References Cited

U.S. PATENT DOCUMENTS

| | | |
|---|---|---|
| 7,073,577 B2 | 7/2006 | Yu |
| 9,151,868 B2 | 10/2015 | Levitan |

(Continued)

FOREIGN PATENT DOCUMENTS

| | | |
|---|---|---|
| WO | 2009155127 | 12/2009 |
| WO | 2012154579 | 11/2012 |

OTHER PUBLICATIONS

Carla Heleen Skinner "Excess Pressure and Reservoir Compartmentalization in the Sable Subbasin offshore nova scotia". (Year: 2016).*

(Continued)

*Primary Examiner* — Regis J Betsch
*Assistant Examiner* — Kaleria Knox
(74) *Attorney, Agent, or Firm* — Fish & Richardson P.C.

(57) ABSTRACT

Methods, systems, and computer-readable medium to perform operations including obtaining data identifying a time-lapse average pressure for each well of a plurality of wells of a reservoir; determining a plurality of homogenous trends of the data; clustering the data into a plurality of groups based on the homogenous trends, each group corresponding to a respective trend; and generating a connected reservoir region map that includes a plurality of connected reservoir regions (CRR) that each correspond to a group of the plurality of groups, each CRR includes a subset of the plurality of wells that corresponds to the respective group of the CRR, wherein each CRR is associated with a homogeneous pressure response.

19 Claims, 12 Drawing Sheets

(51) Int. Cl.
*E21B 41/00* (2006.01)
*E21B 47/00* (2012.01)

(56) References Cited

U.S. PATENT DOCUMENTS

| | | | |
|---|---|---|---|
| 2012/0024524 A1* | 2/2012 | Marsimovich | E21B 43/16 166/254.1 |
| 2013/0268247 A1 | 10/2013 | Rowan | |
| 2013/0282286 A1* | 10/2013 | Thorne | E21B 49/00 702/7 |
| 2014/0149041 A1* | 5/2014 | Sung | G01V 99/005 702/11 |
| 2016/0237814 A1 | 8/2016 | Fripp et al. | |

OTHER PUBLICATIONS

"Permeability Estimation Using Hydraulic Flow Units in a Central Arabia Reservoir" Fahad A. Al-Ajmi (Year: 2000).*

Landa et.al. "Reservoir Characterization Constrained to Well-Test Data: A field Example". (Year: 2019).*

Bonet-Cunha et al., "Hybrid Markov Chain Monte Carlo Method for Generating Permeability Fields Conditioned to Multi-well Pressure Data and Prior Information," SPE 36566, presented at the SPE Annual Technical Conference and Exhibition, Oct. 6-9, 1996, 16 pages.

Ceyhan, "Generation of Porosity and Permeability Fields Conditioned to Geostatistical and Pressure Transient Data," SPE 52089-STU, presented at the 1998 SPE European Petroleum Conference, the Netherlands, Oct. 20-22, 1998, 10 pages.

He et al., "Conditioning Stochastic Reservoir Models to Well Test Data," SPE 38655-MS, presented at the SPE Annual Technical Conference and Exhibition, Oct. 5-8, 1997, 12 pages.

Landa et al., "Reservoir Characterization Constrained to Well Test Data," SPE 36511, presented at the SPE Annual Technical Conference and Exhibition, Oct. 6-9, 1996, 16 pages.

Reynolds et al., "Re-parameterization Techniques for Generating Reservoir Descriptions Conditioned to Variograms and Well-Test Pressure Data," SPE 30588, SPE Journal Issue 1, vol. 4, Dec. 1996, 14 pages.

Srinivasan et al., "Simulation of Permeability Field Conditioned to Well Test Data," SPE 49289, presented at the SPE Annual Technical Conference and Exhibition, Sep. 27-30, 1998, 15 pages.

Vaughan, "Extending the life of Brown Field Developments by Acoustic Impedance-Conditioned 3D Reservoir Modelling: An Example from Mature Gulf of Suez Carbonate Producing Asset (Ras Fanar Field), Egypt," IPTC-18126-MS, presented at the International Petroleum Technology Conference in Malaysia, Dec. 10-12, 2014, 10 pages.

GCC Examination Report in GCC Appln. No. GC 2019-37078, dated Apr. 30, 2020, 4 pages.

International Search Report and Written Opinion issued in International Application No. PCT/US2019/018464 dated May 23, 2019, 17 pages.

Skinner, "Excess Pressure and Reservoir Compartmentalization in the Sable Subbasin, Offshore Nova Scotia Table of Contents," Chapter 5.5. Data Organization and Presentation for Interpretation, Chapter 6, Results and Discussion, retrieved from URL <L:https://dalspace.library.dal.ca/bitstream/handle/10222/71707/Skinner-Carla-MSc-ERTH-May-2016.pdf?sequence=3>, retrieved on May 15, 2019, published May 2016, 124 pages.

Al-Ajmi et al., "Permeability Estimation Using Hydraulic Flow Units in a Central Arabia Reservoir," SPE Annual Technical Conference and Exhbition, HFU Classification Using Core Data; Relating HFU's to Grain Sizes from Core Description; HFU's Predication using Log Data; Oct. 1, 2000, 14 pages.

Mireault et al., "Reservoir Engineering for Geologists Part 5A—Material Balance Analysis," Feb. 1, 2008, retrieved from URL <:https://www.di scoverygeo.com/resources/Papers/Reservoir-Eng-for-Geos-05a.pdf>, retrieved on May 16, 2019, 3 pages.

GCC Examination Report in GCC Appln. No. GC 2019-37078, dated Feb. 21, 2021, 5 pages.

\* cited by examiner

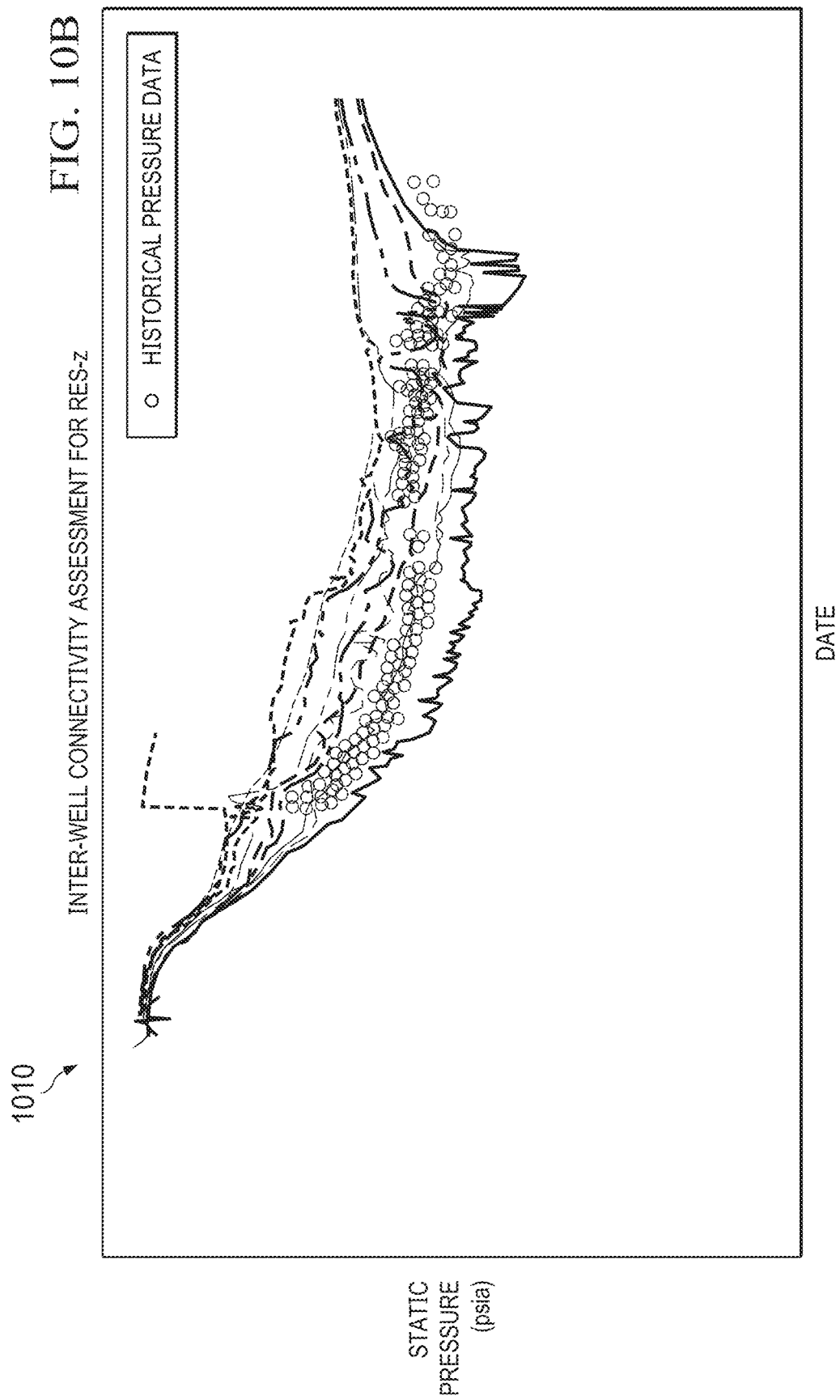

PERMEABILITY PREDICTION USING A CONNECTED RESERVOIR REGIONS MAP

CLAIM OF PRIORITY

This application claims priority to U.S. Patent Application No. 62/633,164 filed on Feb. 21, 2018, the entire contents of which are hereby incorporated by reference.

TECHNICAL FIELD

This disclosure relates to permeability prediction within a reservoir, and in particular, generating a connected reservoir regions map to facilitate this prediction.

BACKGROUND

A geo-model is a three-dimensional (3-D) prototype of the reservoir. One of the properties that is defined in this model is reservoir permeability. In practice, reservoir permeability is typically measured at or vertically along well penetrations. However, depending on the state of reservoir maturity, well spacing within the reservoir may be on the order of 500 m to 1 km (~0.31 miles to 0.62 miles). As a result of this well spacing, it may be difficult to measure from the well penetrations themselves the reservoir permeability between the well penetrations (also referred to as "inter-well reservoir permeability"). To overcome this deficiency, current geo-modeling methods use data available at well penetrations (such as, cores and logs) and statistical, geophysical or depositional analysis techniques to determine inter-well reservoir permeability.

SUMMARY

The present disclosure discusses using time-lapse average shut-in pressure data to determine connected reservoir regions (CRRs). More specifically, the present disclosure utilizes well data and time-lapse average shut-in pressure data to determine the CRRs. Well data, such as well log and core data, provides vertical resolution of heterogeneity while the time-lapse shut-in pressure data indicates regions of lateral continuity of properties between the wells. A map of the CRRs can be used as a basis for creating different permeability functions for 1-dimensional (1-D) permeability predictions for wells that are logged but not cored. Additionally, the map of the CRRs can be used for 3-D inter-well permeability prediction or distribution.

Innovative aspects of the subject matter described in this specification may be embodied in methods that include the actions of obtaining data identifying a time-lapse average pressure for each well of a plurality of wells of a reservoir; determining a plurality of homogenous trends in the data; clustering the data into a plurality of groups based on the homogenous trends, where each group corresponds to a respective trend; and generating a connected reservoir region map that includes a plurality of connected reservoir regions (CRR) that each correspond to a group of the plurality of groups, where each CRR includes a subset of the plurality of wells that corresponds to the respective group of the CRR, and where each CRR is associated with a homogeneous pressure response.

Other embodiments of these aspects include corresponding systems, apparatus, and computer programs, configured to perform the actions of the methods, encoded on computer storage devices.

These and other embodiments may each optionally include one or more of the following features. For instance, for each CRR of the plurality of CRRs, creating a 1-D permeability function based on core and log data from that CRR. Additionally, for each CRR of the plurality of CRRs, distributing permeability within the CRR involves utilizing only wells within that CRR. Determining the plurality of homogenous trends of data further involves determining two or more wells of the plurality of wells that are associated with a homogeneity of average pressure. Generating the connected reservoir region map involves creating a plurality of depositional polygons to delineate wells corresponding to each group from wells corresponding to the other remaining groups. The time-lapse average pressure for each well is a time-lapse average shut-in pressure. Defining, based on the connected reservoir region map, a range of a variogram of the reservoir. Each well of each CRR is hydraulically connected to each other well in the respective CRR. Each CRR is absent of a large-scale permeability barrier.

Particular implementations of the subject matter described in this specification can be implemented in order to improve a reservoir geo-model by providing information about the lateral continuity of reservoir properties that have been observed from well penetrations. The improved reservoir geo-model can include 1-D and 3-D permeability distributions that are a more accurate representation of the reservoir than representations currently achieved in practice.

The details of one or more implementations of the subject matter described in this disclosure are set forth in the accompanying drawings and the description herein. Other features, aspects, and advantages of the subject matter will become apparent from the description, the drawings, and the claims.

BRIEF DESCRIPTION OF THE DRAWINGS

FIG. 10B and FIG. 10C each illustrate results of a simulation using one of the geo-models of FIG. 10A, according to some implementations.

DETAILED DESCRIPTION

The following detailed description describes systems and methods to improve permeability prediction within a reservoir, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

In line with the discussion above, current geo-modeling techniques use data available at well penetrations and statistical, geophysical or depositional analysis techniques to predict inter-well permeability in a reservoir. Although the resulting predictions can be accurate near well penetrations, the accuracy of the predictions are poor in inter-well reservoir areas, in part because the predictions are based on statistical methods. Furthermore, in many instances, the statistical methods can generate several different equiprobable inter-well permeability predictions for the same region. Given that the predictions are equiprobable, it can be difficult to determine the most accurate prediction. To illustrate these deficiencies, consider the predictions made using current geo-modeling techniques in the reservoir of FIG. 1.

Figure 1:
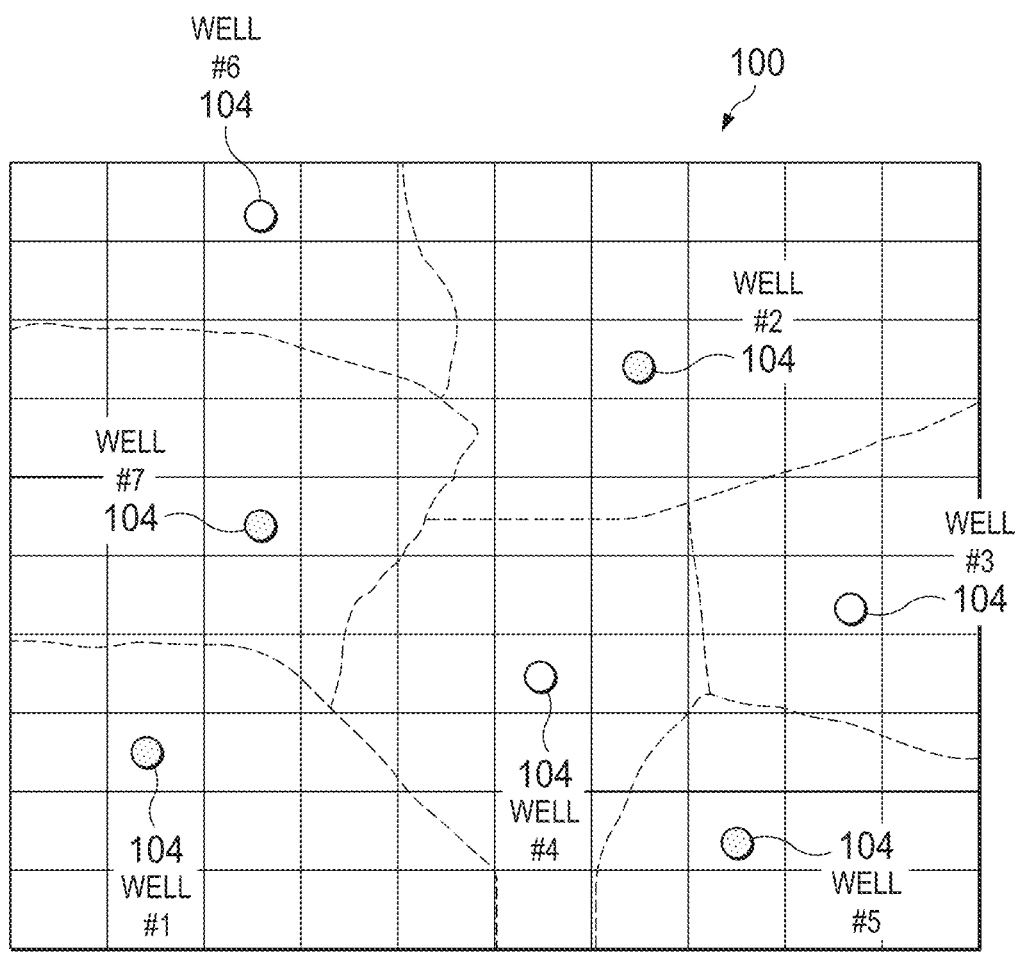
FIG. 1 illustrates a schematic depiction of a reservoir, according to some implementations.

FIG. 1 illustrates a reservoir 100 that includes wells 104, according to some implementations. Current geo-modeling techniques use well data from the wells 104 and statistical, geophysical or depositional analysis to determine permeability in the reservoir 100. In regions at or near the wells 104, current techniques use well data to determine well permeability. And in inter-well regions, the current techniques use statistical, geophysical or depositional analysis to determine inter-well permeability.

Figure 2:
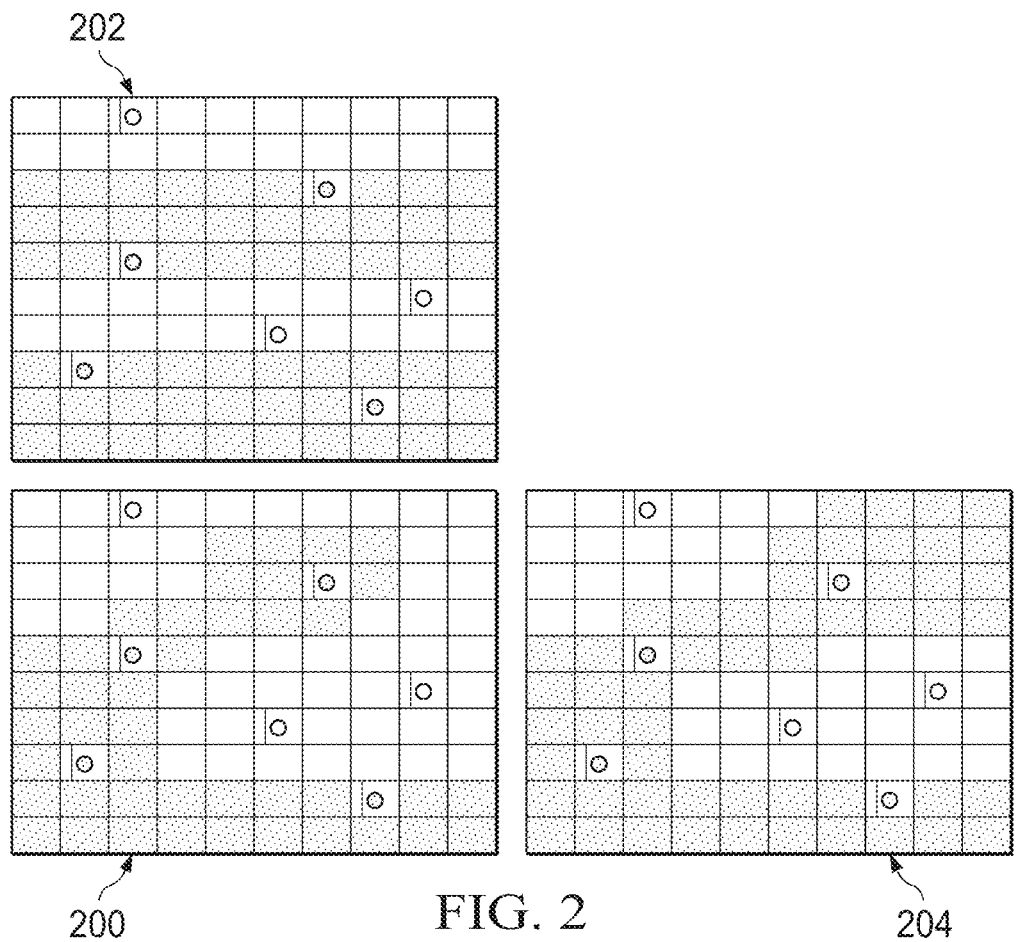
FIG. 2 illustrates three realizations of a reservoir permeability map, according to some implementations.

FIG. 2 illustrates three realizations 200, 202, 204 of permeability predictions in reservoir 100 made using current geo-modeling techniques. Each realization represents a permeability prediction made using the same well data from wells 104. In these realizations, adjacent green grid units indicate predicted regions of permeability in the reservoir 100. As shown in FIG. 2, the permeability predictions are identical at the well penetration points, indicating that the permeability prediction near wells 104 is accurate. However, the permeability predictions are different in the inter-well regions. Given that the predications are equiprobable, it is difficult to determine which prediction is the most accurate. Therefore, a more accurate method of determining reservoir permeability, particularly for the inter-well regions of a reservoir, is desired.

Figure 3:
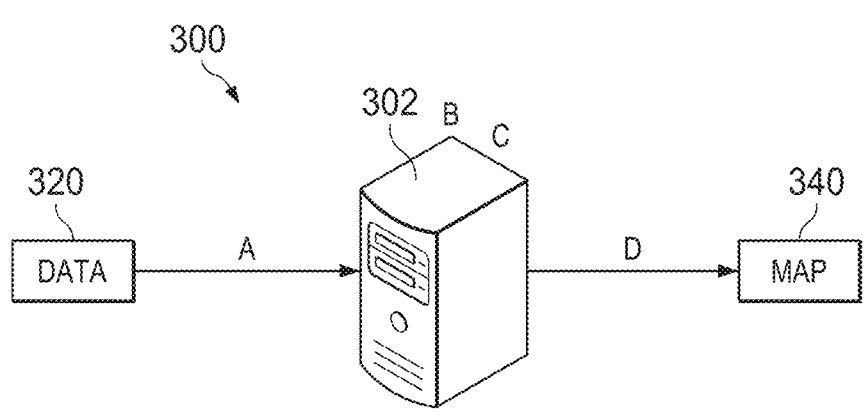
FIG. 3 illustrates a system for generating a connected reservoir region map, according to some implementations.

Disclosed herein is a methodology, including a system 300, shown in FIG. 3, that determines permeability distribution within a reservoir. At a high level, system 300 uses a comparison of time-lapse pressure data from wells, for example, wells 104 of reservoir 100 of FIG. 1, to determine the permeability distribution. In particular, system 300 compares the time-lapse pressure data in order to generate a map that groups wells that have similar time-lapse average pressure trends. The generated map is then used to determine permeability distribution in the reservoir 100. The underlying basis for this determination is that, in a non-faulted reservoir, differences in time-lapse pressure trends between neighboring wells is an indication of discontinuity in reservoir permeability, and similarity in time-lapse pressure trends is an indication of reservoir continuity and connectivity.

As shown in FIG. 3, system 300 includes a computing device 302 that can be in communication with one or more other computing devices (not shown) and data stores (not shown) over one or more networks. FIG. 3 displays a number of steps labeled (A) through (D) that illustrate a flow of data and may be performed in the order illustrated or in another order.

In step A, the computing device 302 obtains data 320 that identifies a time-lapse average pressure for each well of the plurality of wells 104. In some embodiments, the computing device 302 receives the data 320 from a data store (not shown) or in real-time as the data 320 is collected, for example, from the plurality of wells 104. The computing device 302 can receive the data 320 over the one or more networks, or other communication means.

Figure 4:
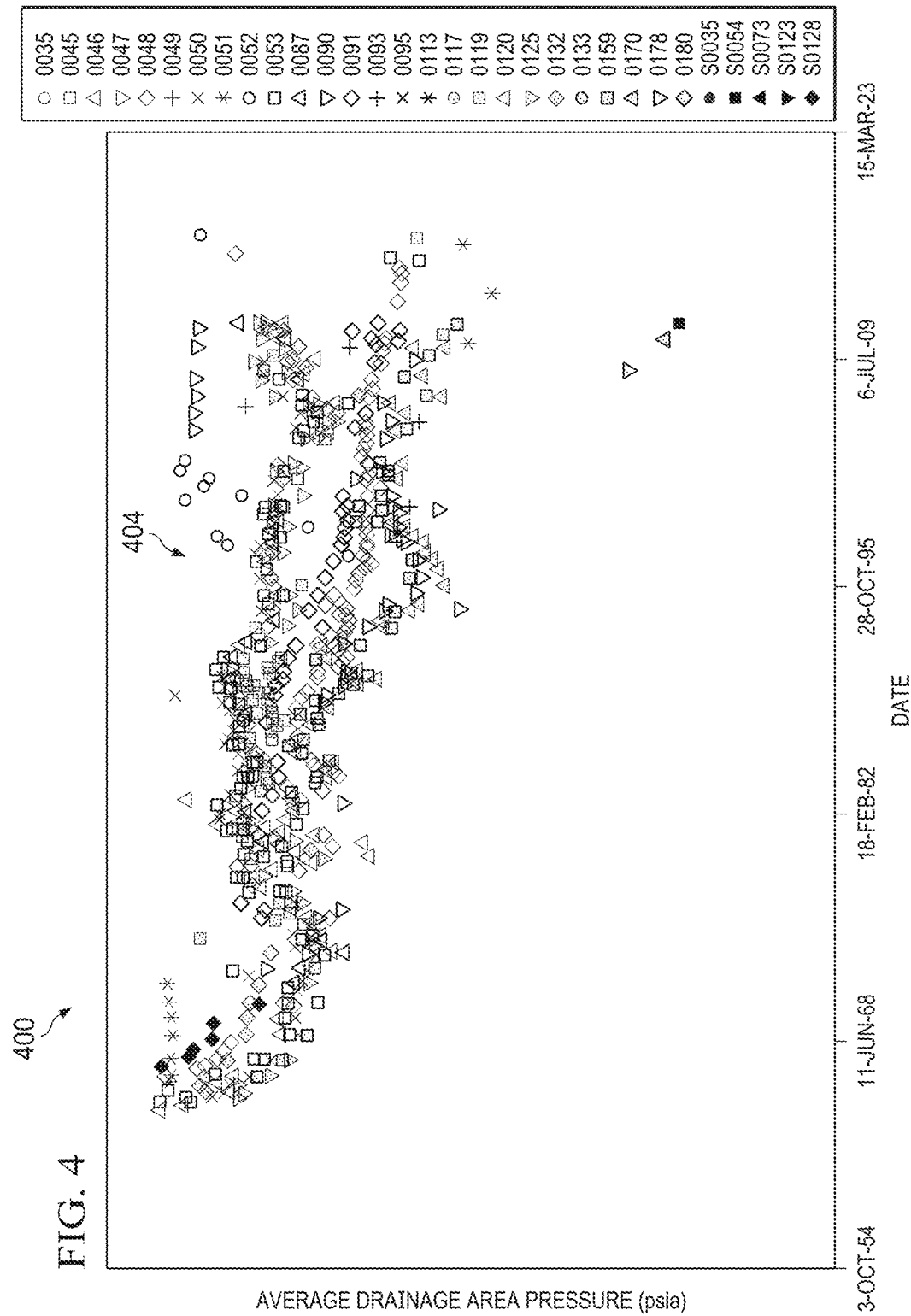
FIG. 4 illustrates a graph that displays a time-lapse average pressure for each well in a reservoir, according to some implementations.
Figure 5B:
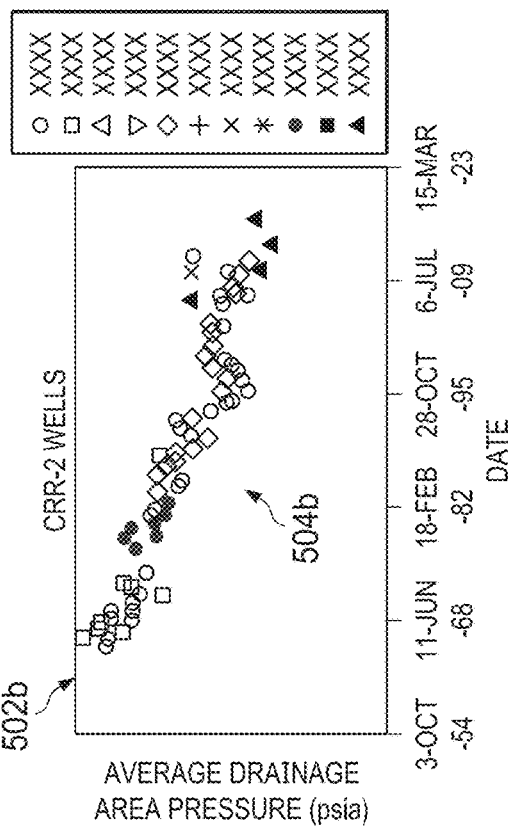
FIGS. 5A-5D illustrate graphs that correspond to homogeneous trends of data of a time-lapse average pressure of each well in a reservoir, according to some implementations.
Figure 5D:
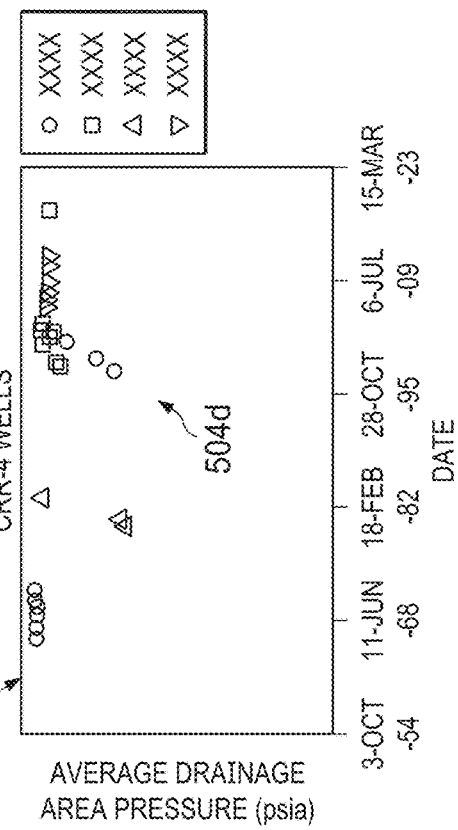
Figure 5A:
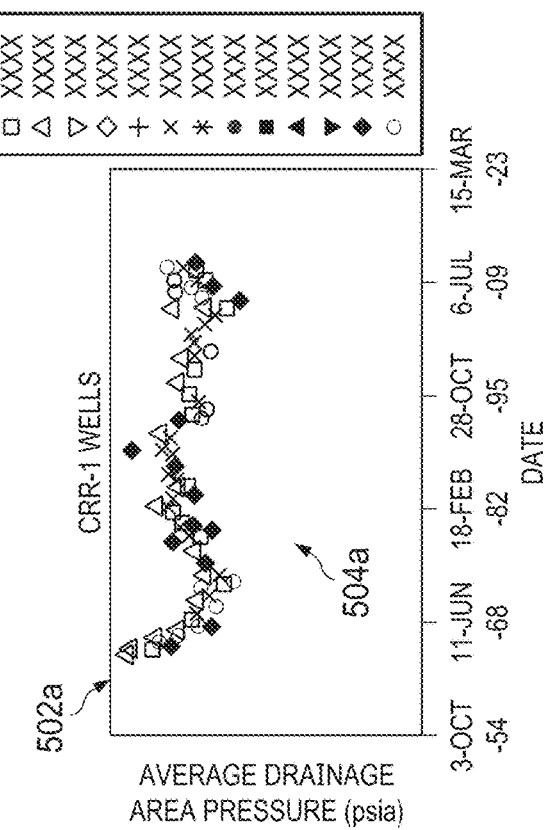
Figure 5C:
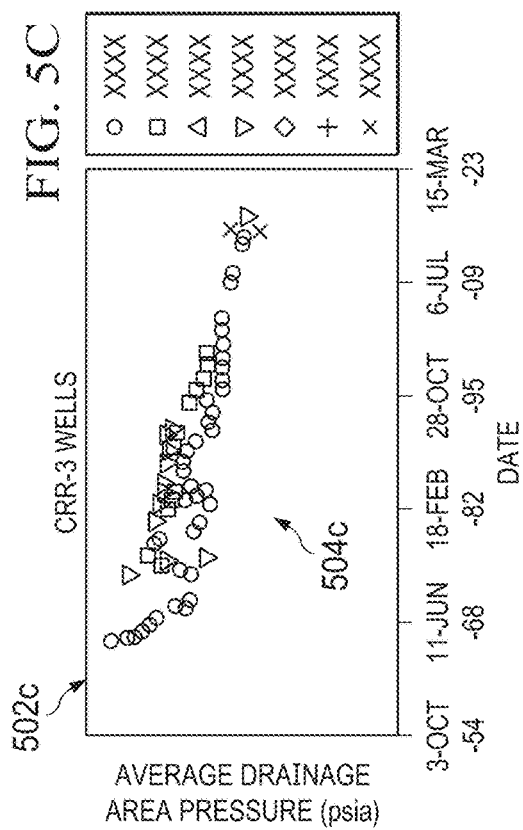

Referring to FIG. 4, a graph 400 displays the time-lapse average pressure for each well of the plurality of wells 104. In particular, the graph 400 displays a heterogeneous cloud 404 of the time-lapse average pressure for each well. In some embodiments, the time-lapse average pressure for each well is a time-lapse average drainage area shut-in pressure of the well. In some embodiments, the data 320 and the graph 400 indicate a reservoir heterogeneity (at a large scale); however, within the heterogeneity, there can exist groups of wells 104 that display homogeneity, described further herein.

In step B, the computing device 302 determines a plurality of homogeneous trends of the data 320. Specifically, the computing device 320 determines that two or more wells of the plurality of wells 104 are associated with a homogeneity of average drainage area pressure of the data 320. For example, FIGS. 5A-5D illustrate graphs 502a, 502b, 502c, 502d (collectively referred to as graphs 502) that respectively correspond to homogeneous trends 504a, 504b, 504c, 504c (collectively referred as homogeneous trends 504) of the data 320. That is, each homogeneous trend 504 of each graph 502 is associated with a respective homogeneous trend of the average pressure data.

In step C, the computing device 302 clusters the data 320 into a plurality of groups based on the homogeneous trends 504. Specifically, the computing device 302 groups the data 320 (including heterogeneous well data) into groups based on the homogeneous trends 504 of the data 320. That is, the computing device 302 determines, based on the homogeneous trends 504, a subset of the plurality of wells 104 that are associated with the same homogeneity of an average drainage area pressure. And each grouping corresponds to a respective homogeneous trend 504. In some embodiments, each grouping identifies a subset of wells for the particular homogeneous trend 504; that is, the subset of wells that are associated with a drainage area pressure of the particular homogeneous trend 504.

In step D, the computing device 302 generates a connected reservoir region (CRR) map 540 that includes a plurality of connected reservoir regions (CRR) that each correspond to a group of the plurality of groups.

Figure 6:
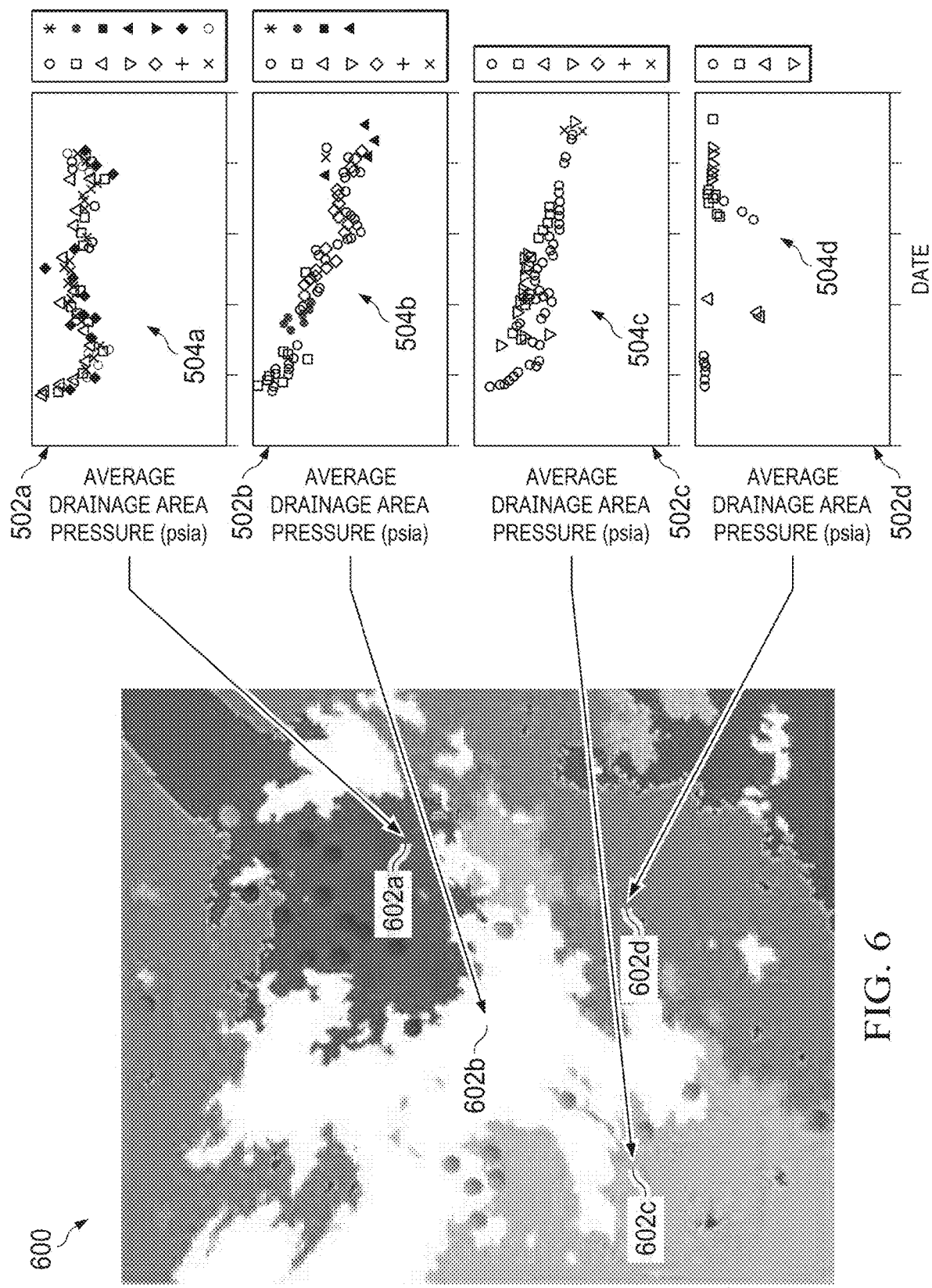
FIG. 6 illustrates a realization of a connected reservoir region map, according to some implementations.

FIG. 6 illustrates an example of the CRR map 340, shown as a CRR map 600 that includes a plurality of CRRs 602. FIG. 6 further includes the graphs 502 juxtaposed to the CRRs 602 indicating a relationship between the homogeneous trends 504 and the CRRs 602, described further herein. Each CRR 602 corresponds to a group of the plurality of groups and includes a subset of the wells 104 that corresponds to the group. For example, the CRR 602a corresponds to the homogeneous trend 504a, and includes a first subset of wells 104 that are associated with the homogeneous trend 504a—that is, wells 104 that are associated with a drainage area pressure of the particular homogeneous trend 504a. Similarly, the CRR 602b corresponds to the homogeneous trend 504b, and includes a second subset of wells 104 that are associated with the homogeneous trend 504b—that is, wells 104 that are associated with a drainage area pressure of the particular homogeneous trend 504b; the CRR 602c corresponds to the homogeneous trend 504c, and includes a third subset of wells 104 that are associated with the homogeneous trend 504c—that is, wells 104 that are associated with a drainage area pressure of the particular homogeneous trend 504c; and the CRR 602d corresponds to the homogeneous trend 504d, and includes a fourth subset of wells 104 that are associated with the homogeneous trend 504d—that is, wells 104 that are associated with a drainage area pressure of the particular homogeneous trend 504d. In some embodiments, each of the first, second, third, and fourth subset of wells 104 differ from one another. In some embodiments, each of the CCRs 602 is associated with a homogeneous pressure response.

In some embodiments, generating the CRR map 340 and the CRR map 600 includes creating a plurality of depositional polygons to delineate wells corresponding to each group of wells 104 from wells corresponding to the other remaining groups. That is, by delineating the wells 104 as such, the CRR map 340 and the CRR map 600 indicates that each well 104 of each group is hydraulically connected to each other well 104 in the respective CRR 602. In some embodiments, each CRR 602 is absent of a large-scale permeability barrier. Thus, the CRR map 340 and the CRR map 600 may be used to determine whether there is continuity, baffle, or barrier between the wells.

Within embodiments, a CRR map may be used to determine permeability distribution in a reservoir.

In an implementation, the CRR map may be used to improve modeling of 1-D permeability of logged but not cored wells in a reservoir. By way of background, at the early stages of well drilling in a new reservoir, most of the well penetrations are both logged and cored in order to obtain sufficient data for reservoir modeling and description. However, wells that are subsequently drilled are typically logged but not cored. For such wells that lack core data, it may be difficult to accurately determine permeability solely from well logs.

In practice, in order to predict the permeability of logged but not cored wells, a permeability function is created to predict the permeability. Current techniques create the permeability function by using logged and cored wells as a training set. In particular, the training dataset is used to establish a relationship between core permeability and log response, and this relationship is then used to predict permeability for the wells. At least one well having both core and log data is left out of the training dataset so that it can be used to evaluate the predictive capacity of the derived permeability function in a process called blind-testing.

However, these current techniques create the permeability function using all available core and log data from the reservoir without discrimination of the various heterogeneous regions in the reservoir. As a result, both the good reservoir quality and the poor reservoir quality core and log data are used together to obtain a single average permeability function. Such a permeability function would result in an optimistic prediction for the low quality reservoir area and a pessimistic prediction for the good quality reservoir area.

In an embodiment, a CRR map may be used as a basis for driving 1-D permeability function modeling. In this embodiment, rather than using all the cored and logged wells in a reservoir to create a permeability function for all the logged but not cored wells in the reservoir (as is done in current techniques), different permeability functions are created for different CRRs using only datasets within each CRR. That is, the cored and logged wells in a given CRR are used to create a permeability function for the cored but not logged wells in that CRR. When only data within each CRR is used to create separate permeability function for that CRR, the result would be free from the biases of other CRRs, and therefore, better reflects the properties of the CRR.

Figure 7:
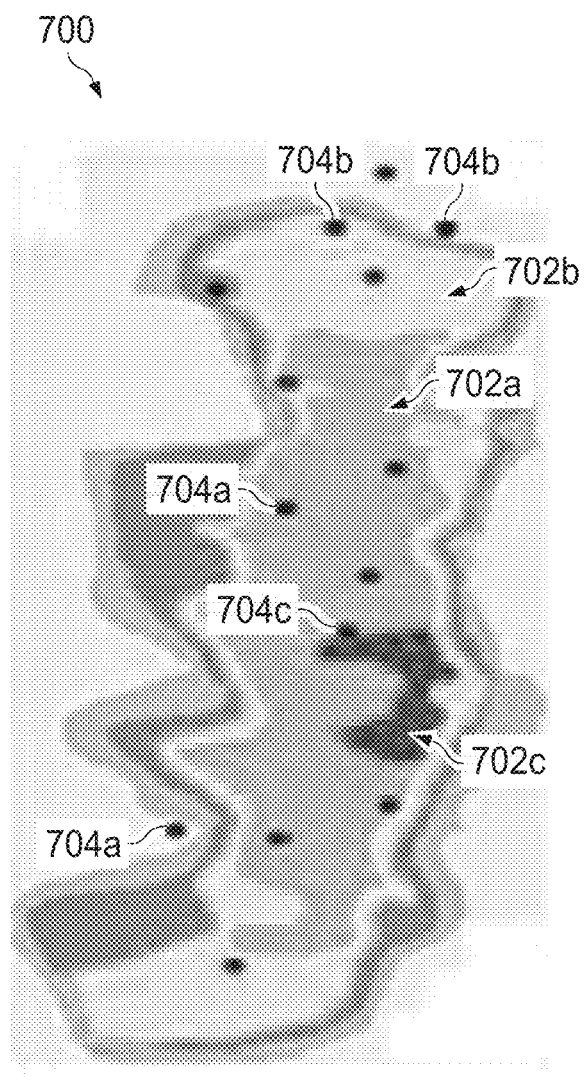
FIG. 7 illustrates another realization of a connected reservoir region map, according to some implementations.

FIG. 7 illustrates a CRR map 700 of a reservoir, according to some implementations. The CRR map 700 is color coded to illustrate the different CRRs in the reservoir. As shown in FIG. 7, the reservoir has three CRRs 702a, 702b, 702c. FIG. 7 also illustrates the logged and cored wells in the reservoir by circles imposed on the CRR map 700. For example, the CRR 702a includes wells 704a, the CRR 702b includes wells 704b, and the CRR 702c includes well 704c. In an embodiment, a permeability function is created for each CRR using the logged and cored wells in that CRR. That is, the logged and cored wells 704a are used to create a permeability function for the CRR 702a, the logged and cored wells 704b are used to create a permeability function for the CRR 702b, and the logged and cored wells 704c are used to create a permeability function for the CRR 702c.

Figure 8:
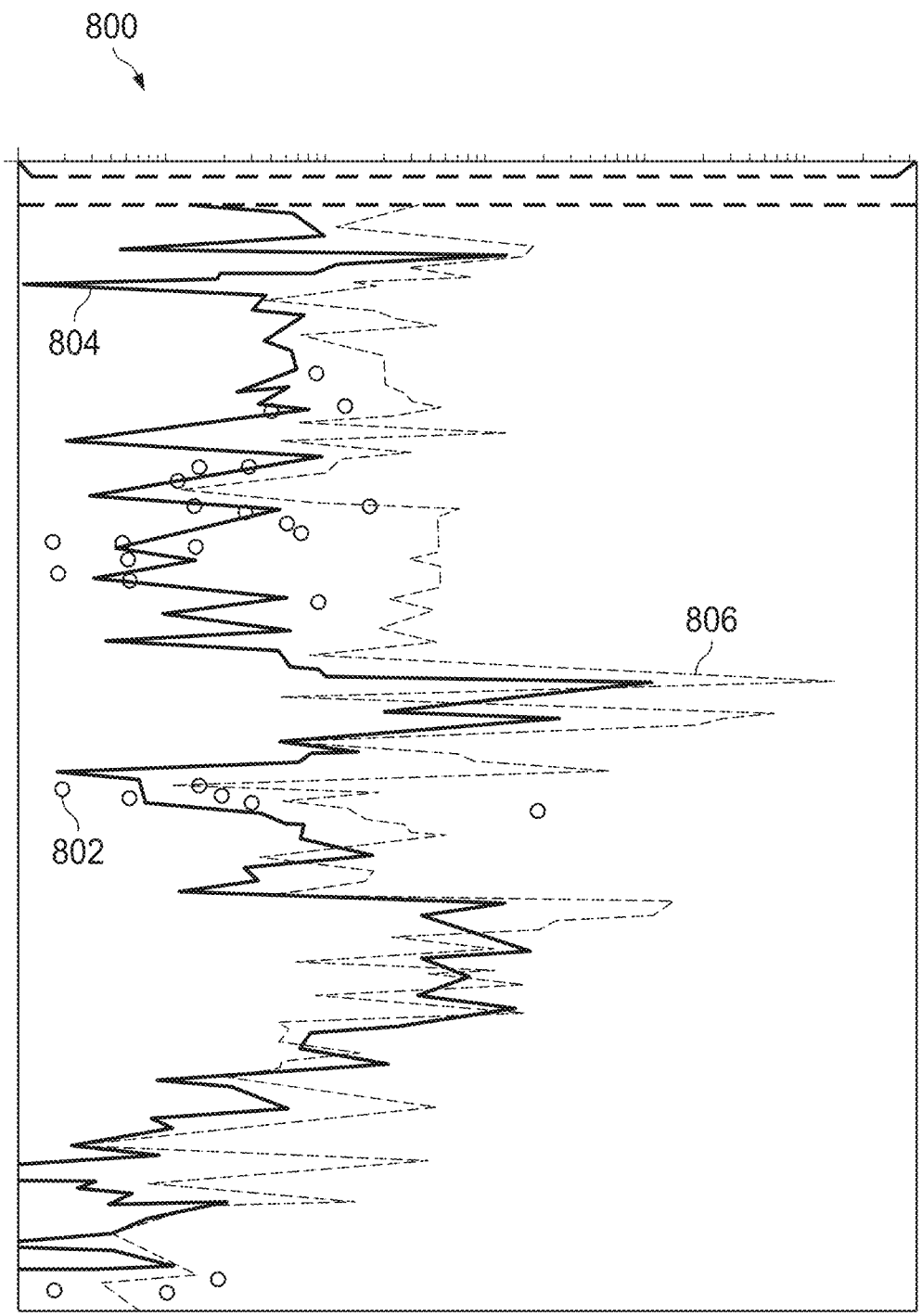
FIG. 8 illustrates a 1-D permeability graph, according to some implementations.

FIG. 8 illustrates a permeability graph 800, according to some implementations. The permeability graph 800 is used as a blind-test comparison of permeability functions currently used in practice and permeability functions derived using a CRR map. In order to compare the different permeability functions, the graph 800 depicts the permeability predicted by each permeability function for the same group of wells in a CRR. In FIG. 8, the dots 802 are indicative of core data of a blind-test well, line 806 is the permeability predicted by a permeability function currently used in practice, and line 804 is the permeability predicted by a CRR driven permeability function. As shown in FIG. 8, line 804 more closely tracks the dots 802 than line 806. Therefore, the CRR driven permeability function is more accurate than the permeability functions currently used in practice.

In another implementation, a CRR map may be used as a basis for driving 3-D permeability distribution in a reservoir. In this implementation, a separate 3-D permeability distribution is determined for each CRR using well data from wells in that CRR. More specifically, in a given CRR region, the 3-D permeability distribution is determined only using the 1-D well permeability logs from that CRR. For instance, in the example of FIG. 6, for each CRR 602, the permeability distribution within the CRR 602 is determined utilizing only wells within the CRR 602 and the 1-D permeability logs thereof. As a result of separately determining the permeability distribution for each CRR using the wells in that CRR, low permeability data from a neighboring low permeability CRR 602 is not statistically distributed into a nearby high permeability CRR 602. Note that in reservoirs that include logged but not cored wells, the CRR map may first be used to determine the 1-D permeability log for those wells so that the 1-D permeability logs may be used to determine the 3-D permeability distribution.

Additionally and/or alternatively, when determining the 3-D permeability distribution of a CRR, the 3-D permeability distribution variogram is chosen so as to ensure that no low permeability barrier is distributed within that CRR. In an implementation, the variogram is selected such that no low permeability barrier occurs within the CRR. That is, by using the CRR map, and in coordination with core and log data of the wells in the reservoir, the variogram is selected such as to avoid any occurrence of unwanted heterogeneity within any given CRR. In an example, the variogram range is calculated as half of maximum inter-well distance within each CRR. In this example, the permeability within a given CRR is fully correlated, and therefore, is uniform.

Figure 9:
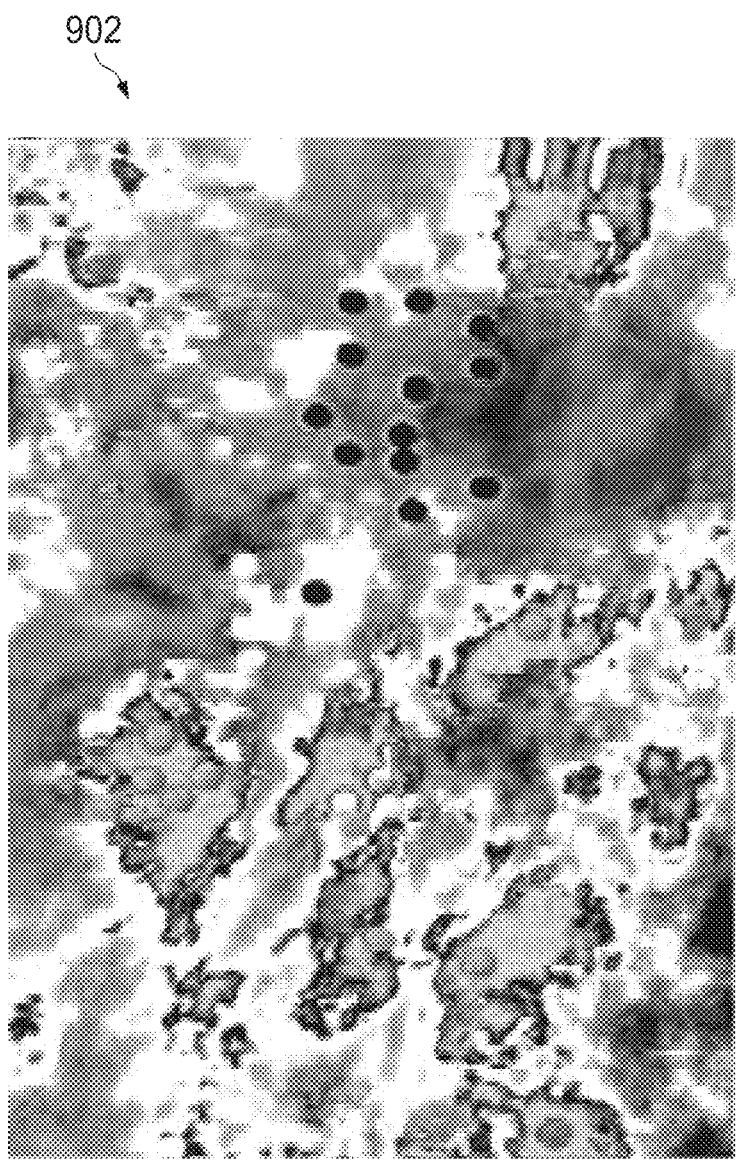
FIG. 9 illustrates a 3-D permeability distribution map of a reservoir, according to some implementations.

FIG. 9 illustrates an example map 902 of a 3-D permeability distribution in a reservoir, according to some implementations. In an implementation, the 3-D permeability distribution in the reservoir is determined using a CRR map of the reservoir.

Figure 10A:
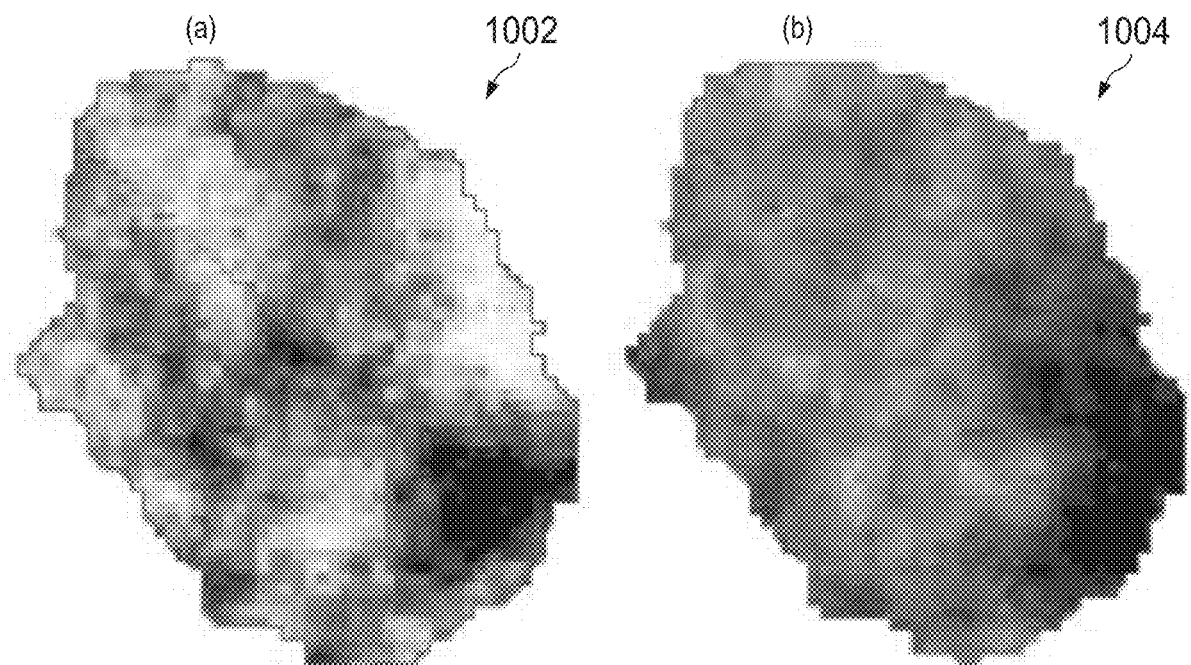
FIG. 10A illustrates two geo-models of a reservoir, according to some implementations.

FIG. 10A illustrates two geo-models 1002, 1004 of a reservoir, according to some implementations. The geo-models 1002, 1004 each depict permeability distribution of the reservoir. Both geo-models are generated using the same set of well data. However, the geo-model 1002 is generated using a method of variogram determination currently used in practice, and the geo-model 1004 is generated using the CRR driven method described herein. In this example reservoir, the method of variogram determination currently used in practice determined a short variogram range, thereby leading to severe permeability heterogeneity. On the other hand, the CRR driven method determined a longer variogram range, thereby leading to better continuity of reservoir permeability. Furthermore, in this example, observed time-lapse pressure data from the wells in this reservoir indicate that the wells are fully in communication indicating uniformity of permeability.

FIG. 10B illustrates results of a reservoir simulation carried out with the geo-model 1002, according to some implementations. As shown in FIG. 10B, the results show poor communication between the wells of the reservoir, which is not what is suggested by the observed pressure data.

Figure 10C:
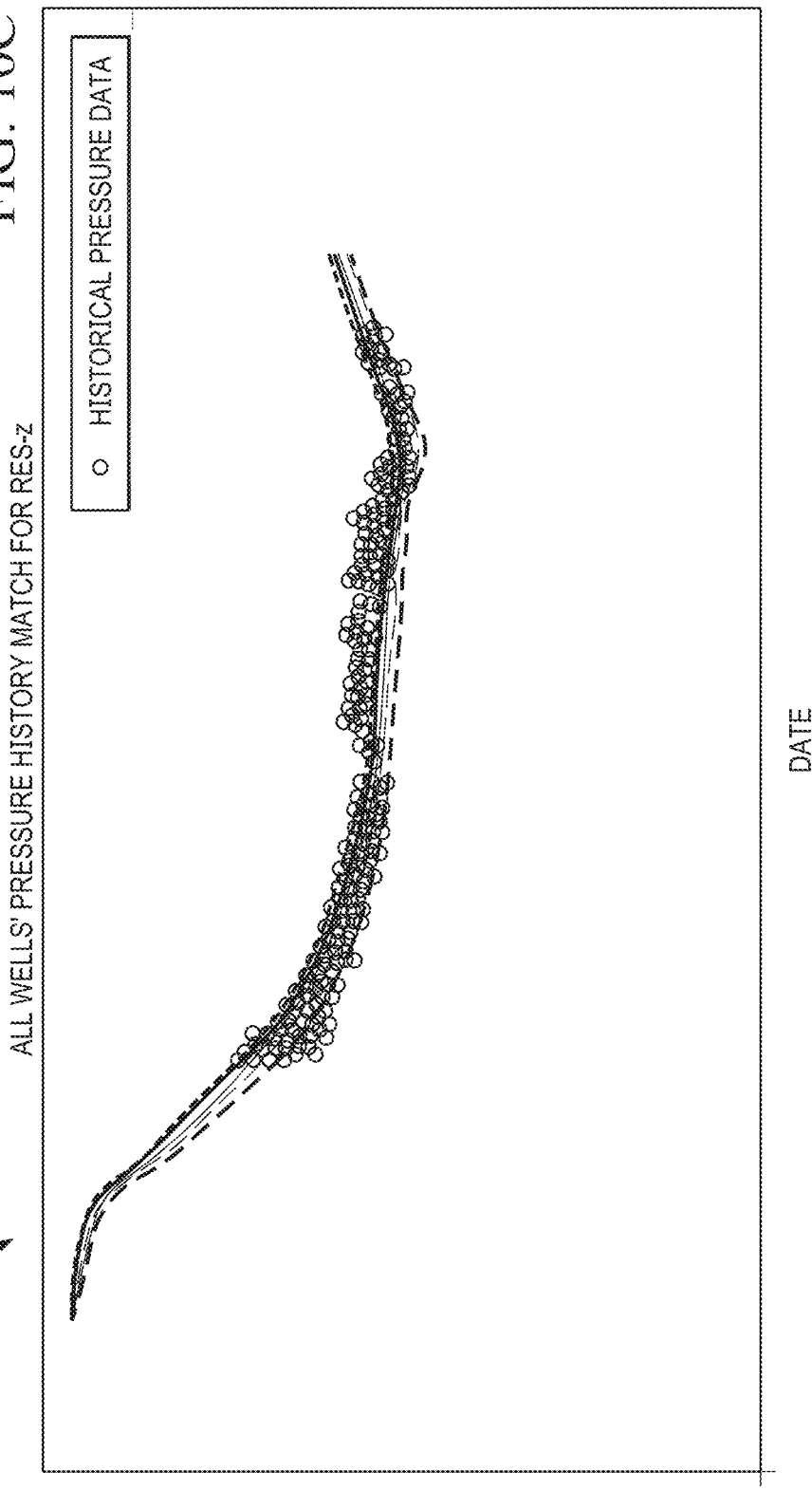

FIG. 10C illustrates results of a reservoir simulation carried out with the geo-model 1004, according to some implementations. As shown in FIG. 10C, the results shows excellent communication between wells, which is in agreement with the observed pressure data.

Figure 11:
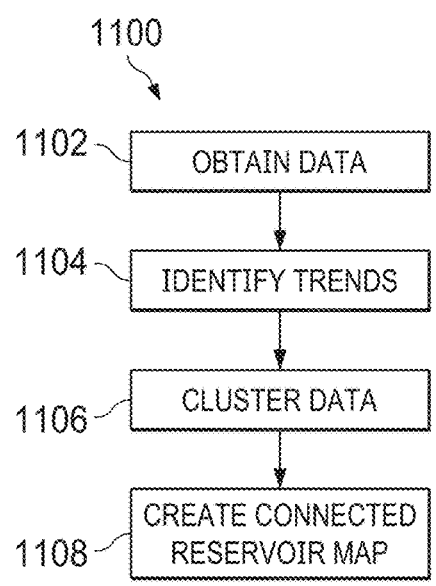
FIG. 11 illustrates a flow chart of a method for determining 3-D permeability distribution within a reservoir, according to some implementations.

FIG. 11 illustrates a flow chart that illustrates a method 1100 for 3-D permeability distribution within a reservoir. For clarity of presentation, the description that follows describes method 1100 in the context of FIGS. 2-10. For example, as illustrated, particular steps of the method 1100 may be performed on or at the computing system 300. However, method 1100 may be performed, for example, by any other suitable system, environment, software, and hardware, or a combination of systems, environments, software, and hardware as appropriate. Operations of method 1100 can include one or more optional steps, including only one or more of the steps being performed.

At step 1102, the data 320 is obtained by the computing device 302 that identifies a time-lapse average drainage area pressure for each well 104 of a reservoir 102. At step 1104, the homogenous trends 504 of the data 320 are determined by the computing device 302. At step 1106, the data 320 is clustered into groups based on the homogenous trends 504. In some embodiments, each group corresponds to a respective homogeneous trend 504. At step 1108, a connected reservoir region map 600 is generated by the computing device 302. In some embodiments, the map 600 includes connected reservoir regions (CRR) 602 that each correspond to a group of the plurality of groups of trends. In some embodiments, each CRR 602 includes a subset of the wells 104 that corresponds to the respective group of the CRR 602. In some embodiments, each CRR 602 is associated with a homogeneous pressure response.

Figure 12:
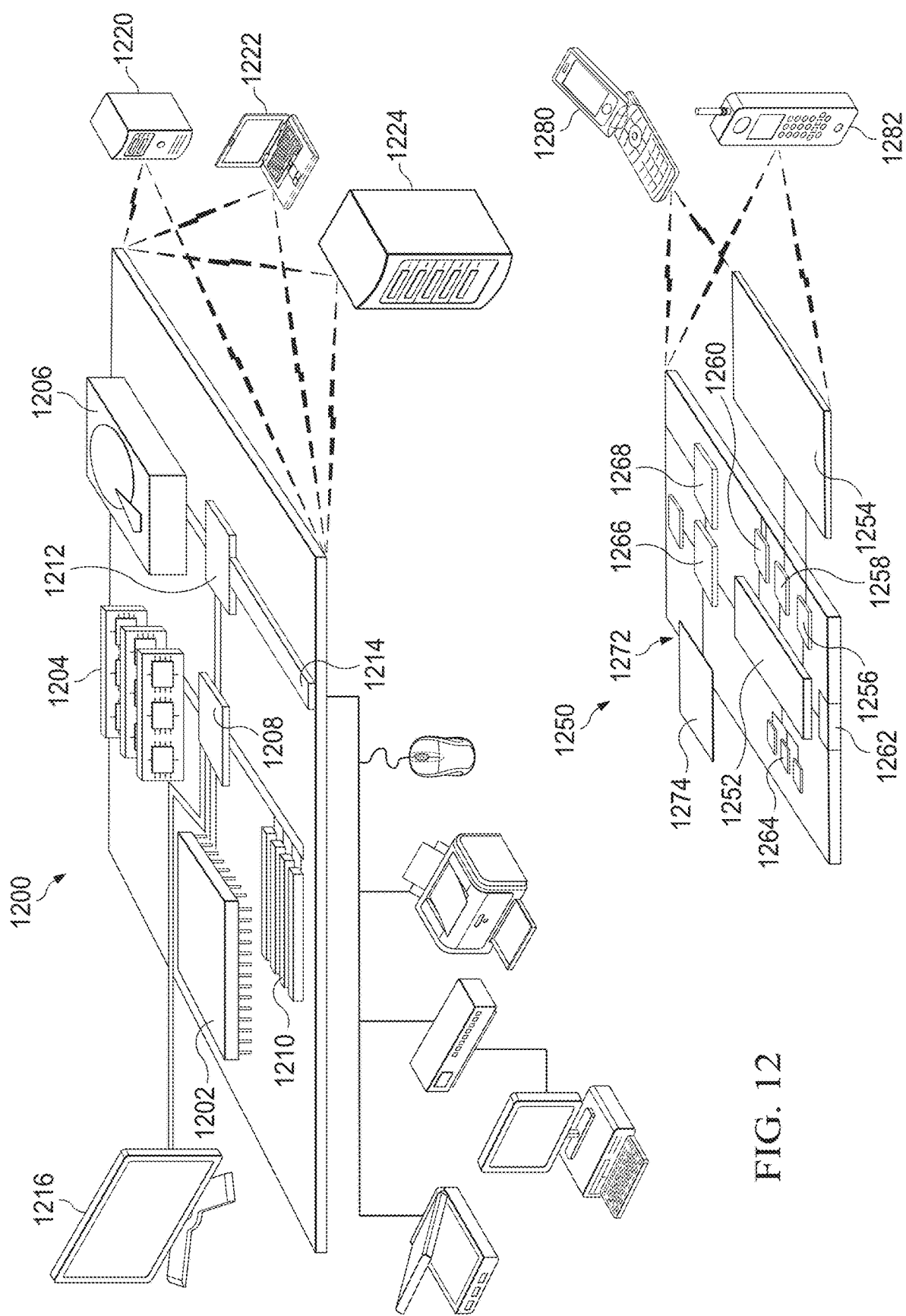
FIG. 12 illustrates an example computing environment for implementing the techniques described herein, according to some implementations.

FIG. 12 shows an example of a generic computer device 1200 and a generic mobile computer device 1250, which are used with the techniques described here. Computing device 1200 is intended to represent various forms of digital computers, such as laptops, desktops, workstations, personal digital assistants, servers, blade servers, mainframes, and other appropriate computers. Computing device 1250 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. Each of the components 1202, 1204, 1206, 1208, 1210, and 1212, are interconnected using various busses, and are mounted on a common motherboard or in other manners as appropriate. The processor 1202 processes instructions for execution within the computing device 1200, including instructions stored in the memory 1204 or on the storage device 1206 to display graphical information for a GUI on an external input/output device, such as display 1216 coupled to high speed interface 1208. In other implementations, multiple processors, multiple buses, or both are used, as appropriate, along with multiple memories and types of memory. Also, multiple computing devices 1200 are connected, with each device providing portions of the necessary operations (for example, as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 contains a computer-readable medium, such as a floppy disk device, a hard disk device, an optical disk device, or a tape device, a flash memory or other similar solid state memory device, or an array of devices, including devices in a storage area network or other configurations. A computer program product is tangibly embodied in an information carrier. The computer program product may also contain instructions that, when executed, perform one or more methods, such as those described herein. The information carrier is a computer- or machine-readable medium, such as the memory 1204, the storage device 1206, or a memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (for example, through a graphics processor or accelerator), and to high-speed expansion ports 1210, which accepts various expansion cards (not shown). In the implementation, low-speed controller 1212 is coupled to storage device 1206 and low-speed expansion port 1214. The low-speed expansion port, which includes various communication ports (for example, USB, Bluetooth, Ethernet, wireless Ethernet) are coupled to one or more input/output devices, such as a keyboard, a pointing device, a scanner, or a networking device such as a switch or router, for example, through a network adapter.

The computing device 1200 are implemented in a number of different forms, as shown in the figure. For example, it is implemented as a standard server 1220, or multiple times in a group of such servers. It may also be implemented as part of a rack server system 1224. In addition, it may be implemented in a personal computer such as a laptop computer 1222. Alternatively, components from computing device 1200 are combined with other components in a mobile device (not shown), such as device 1250. Each of such devices contains one or more of computing device 1200, 1250, and an entire system are made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components are mounted on a common motherboard or in other manners as appropriate.

The processor 1252 executes instructions within the computing device 1250, including instructions stored in the memory 1264. The processor is implemented as a chipset of chips that include separate and multiple analog and digital processors. The processor provides, for example, for coordination of the other components of the device 1250, such as control of user interfaces, applications run by device 1250, and wireless communication by device 1250.

Processor 1252 communicates with a user through control interface 1258 and display interface 1256 coupled to a display 1254. The display 1254 is, for example, a TFT LCD (Thin-Film-Transistor Liquid Crystal Display) or an OLED (Organic Light Emitting Diode) display, or other appropriate display technology. The display interface 1256 comprises appropriate circuitry for driving the display 1254 to present graphical and other information to a user. The control interface 1258 receives commands from a user and convert them for submission to the processor 1252. In addition, an external interface 1262 is in communication with processor 1252, so as to enable near area communication of device 1250 with other devices. External interface 1262 provides, for example, for wired communication in some implementations, or for wireless communication in other implementations, and multiple interfaces may also be used.

The memory 1264 stores information within the computing device 1250. The memory 1264 is implemented as one or more of a computer-readable medium or media, a volatile memory unit or units, or a non-volatile memory unit or units. Expansion memory 1274 is also provided and connected to device 1250 through expansion interface 1272, which may include, for example, a SIMM (Single In Line Memory Module) card interface. Such expansion memory 1274 provides extra storage space for device 1250, or also store applications or other information for device 1250. Specifically, expansion memory 1274 includes instructions to carry out or supplement the processes described herein, and includes secure information also. Thus, for example, expansion memory 1274 provides as a security module for device 1250, and is programmed with instructions that permit secure use of device 1250. In addition, secure applications are provided via the SIMM cards, along with additional information, such as placing identifying information on the SIMM card in a non-hackable manner.

The memory includes, for example, flash memory, NVRAM memory, or both, as discussed herein. In one implementation, a computer program product is tangibly embodied in an information carrier. The computer program product contains instructions that, when executed, perform one or more methods, such as those described herein. The information carrier is a computer- or machine-readable medium, such as the memory 1264, expansion memory 1274, memory on processor 1252, or a propagated signal that is received, for example, over transceiver 1268 or external interface 1262.

Device 1250 communicates wirelessly through communication interface 1266, which includes digital signal processing circuitry where necessary. Communication interface 1266 provides for communications under various modes or protocols, such as GSM voice calls, SMS, EMS, or MMS messaging, CDMA, TDMA, PDC, WCDMA, CDMA2000, or GPRS, among others. Such communication occur, for example, through radio-frequency transceiver 1268. In addition, short-range communication occur, such as using a Bluetooth, WiFi, or other such transceiver (not shown). In addition, GPS (Global Positioning System) receiver module 1250 provides additional navigation- and location-related wireless data to device 1250, which are used as appropriate by applications running on device 1250.

Device 1250 also communicates audibly using audio codec 1260, which receives spoken information from a user and convert it to usable digital information. Audio codec 1260 likewise generates audible sound for a user, such as through a speaker, for example, in a handset of device 1250. Such sound includes sound from voice telephone calls, includes recorded sound (for example, voice messages, music files, etc.) and also includes sound generated by applications operating on device 1250.

The computing device 1250 is implemented in a number of different forms, as shown in the figure. For example, it is implemented as a cellular telephone 1280. It is also implemented as part of a smartphone 1282, personal digital assistant, or other similar mobile device.

Various implementations of the systems and techniques described here are realized in digital electronic circuitry, integrated circuitry, specially designed ASICs (application specific integrated circuits), computer hardware, firmware, software, and combinations thereof. These various implementations include implementations in one or more computer programs that are executable and interpretable on a programmable system including at least one programmable processor, which are special or general purpose, coupled to receive data and instructions from, and to transmit data and instructions to, a storage system, at least one input device, and at least one output device.

These computer programs (also known as programs, software, software applications or code) include machine instructions for a programmable processor, and are implemented in a high-level procedural and object-oriented programming language, and in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and data to a programmable processor, including a machine-readable medium that receives machine instructions as a machine-readable signal. The term "machine-readable signal" refers to any signal used to provide machine instructions and data to a programmable processor.

To provide for interaction with a user, the systems and techniques described here are implemented on a computer having a display device (for example, a CRT (cathode ray tube) or LCD (liquid crystal display) monitor) for displaying information to the user and a keyboard and a pointing device (for example, a mouse or a trackball) by which the user provides input to the computer. Other kinds of devices are used to provide for interaction with a user as well; for example, feedback provided to the user are any form of sensory feedback (for example, visual feedback, auditory feedback, or tactile feedback); and input from the user is received in any form, including acoustic, speech, or tactile input.

The systems and techniques described here are implemented in a computing system that includes a back end component (for example, as a data server), or that includes a middleware component (for example, an application server), or that includes a front end component (for example, a client computer having a graphical user interface or a Web browser through which a user interacts with an implementation of the systems and techniques described here), or any combination of such back end, middleware, or front end components. The components of the system are interconnected by any form or medium of digital data communication (for example, a communication network). Examples of communication networks include a local area network ("LAN"), a wide area network ("WAN"), and the Internet.

The computing system includes clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what are claimed, but rather as descriptions of features of example implementations of the disclosure. Certain features that are described in this disclosure in the context of separate implementations are also provided in combination in a single implementation. Conversely, various features that are described in the context of a single implementation are also provided in multiple implementations separately or in any suitable subcombination. Moreover, although features are described herein as acting in certain combinations and even initially claimed as such, one or more features from a claimed combination are in some cases be excised from the combination, and the claimed combination are directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing are advantageous. Moreover, the separation of various system components in the implementations described herein should not be understood as requiring such separation in all implementations, and it should be understood that the described program components and systems can be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications are made without departing from the spirit and scope of the disclosure. For example, various forms of the flows shown herein are used, with steps re-ordered, added, or removed. Accordingly, other implementations are within the scope of the following claims.

I claim:

1. A method, comprising:
   receiving (i) pressure data identifying a time-lapse average shut-in pressure data for each well of a plurality of wells of a reservoir, and (ii) well data for the plurality of wells;
   determining a plurality of homogenous trends in the pressure data;
   clustering the pressure data into a plurality of groups based on the homogenous trends, each group corresponding to a respective trend;
   generating a connected reservoir region map that includes a plurality of connected reservoir regions (CRR) that each correspond to a group of the plurality of groups, wherein each CRR includes a subset of the plurality of wells that corresponds to the respective group of the CRR, and wherein each CRR is associated with a homogeneous pressure response;
   for each CRR of the plurality of CRRs, creating a respective 1-dimensional (1-D) permeability function based on the well data from that CRR; and
   generating, based on the respective 1-D permeability function of each CRR, a 3-dimensional (3-D) permeability distribution map of the reservoir.

2. The method of claim 1, wherein the well data comprises at least one of core data or log data from the plurality of wells.

3. The method of claim 1, wherein generating, based on the respective 1-D of each CRR, a 3-dimensional (3-D) permeability distribution map of the reservoir comprises:
   for each CRR of the plurality of CRRs, determining a respective permeability distribution within the CRR utilizing the respective 1-D permeability function of that CRR; and
   generating the 3-D permeability distribution map based on the respective permeability distribution within each CRR.

4. The method of claim 1, wherein determining the plurality of homogenous trends in the pressure data further comprises determining two or more wells of the plurality of wells that are associated with a homogeneity of time-lapse average shut-in pressure.

5. The method of claim 1, wherein generating the connected reservoir region map comprises creating a plurality of depositional polygons to delineate wells corresponding to each group from wells corresponding to the other remaining groups.

6. The method of claim 1, further comprising defining, based on the connected reservoir region map, a range of a variogram of the reservoir.

7. The method of claim 1, wherein each well of each CRR is hydraulically connected to each other well in the respective CRR.

8. The method of claim 1, wherein each CRR is absent of a large-scale permeability barrier.

9. A system, comprising:
one or more processors; and
a non-transitory computer-readable storage medium coupled to the one or more processors and storing programming instructions for execution by the one or more processors, the programming instructions instructing the one or more processors to perform operations comprising:
receiving (i) pressure data identifying a time-lapse average shut-in pressure data for each well of a plurality of wells of a reservoir, and (ii) well data for the plurality of wells;
determining a plurality of homogenous trends in the pressure data;
clustering the pressure data into a plurality of groups based on the homogenous trends, each group corresponding to a respective trend;
generating a connected reservoir region map that includes a plurality of connected reservoir regions (CRR) that each correspond to a group of the plurality of groups, wherein each CRR includes a subset of the plurality of wells that corresponds to the respective group of the CRR, and wherein each CRR is associated with a homogeneous pressure response;
for each CRR of the plurality of CRRs, creating a respective 1-dimensional (1-D) permeability function based on the well data from that CRR; and
generating, based on the respective 1-D permeability function of each CRR, a 3-dimensional (3-D) permeability distribution map of the reservoir.

10. The method of claim 1, wherein the well data provides vertical resolution of heterogeneity in the reservoir, and the time-lapse shut-in pressure data indicates regions of lateral continuity of properties between the wells in the reservoir.

11. The system of claim 9, wherein the well data comprises at least one of core data or log data from the plurality of wells.

12. The system of claim 9, wherein determining the plurality of homogenous trends in the pressure data further comprises determining two or more wells of the plurality of wells that are associated with a homogeneity of time-lapse average shut-in pressure.

13. The system of claim 9, wherein generating the connected reservoir region map comprises creating a plurality of depositional polygons to delineate wells corresponding to each group from wells corresponding to the other remaining groups.

14. The system of claim 9, the operations further comprising defining, based on the connected reservoir region map, a range of a variogram of the reservoir.

15. The system of claim 9, wherein each well of each CRR is hydraulically connected to each other well in the respective CRR.

16. The system of claim 9, wherein each CRR is absent of a large-scale permeability barrier.

17. A non-transitory computer readable medium storing instructions to cause one or more processors to perform operations comprising:
receiving (i) pressure data identifying a time-lapse average shut-in pressure data for each well of a plurality of wells of a reservoir, and (ii) well data for the plurality of wells;
determining a plurality of homogenous trends in the pressure data;
clustering the pressure data into a plurality of groups based on the homogenous trends, each group corresponding to a respective trend;
generating a connected reservoir region map that includes a plurality of connected reservoir regions (CRR) that each correspond to a group of the plurality of groups, wherein each CRR includes a subset of the plurality of wells that corresponds to the respective group of the CRR, and wherein each CRR is associated with a homogeneous pressure response;
for each CRR of the plurality of CRRs, creating a respective 1-dimensional (1-D) permeability function based on the well data from that CRR; and
generating, based on the respective 1-D permeability function of each CRR, a 3-dimensional (3-D) permeability distribution map of the reservoir.

18. The non-transitory computer readable medium of claim 17, wherein generating, based on the respective 1-D of each CRR, a 3-dimensional (3-D) permeability distribution map of the reservoir comprises:
determining a respective permeability distribution within the CRR utilizing the respective 1-D permeability function of that CRR; and
generating the 3-D permeability distribution map based on the respective permeability distribution within each CRR.

19. The non-transitory computer readable medium of claim 17, wherein generating the connected reservoir region map comprises creating a plurality of depositional polygons to delineate wells corresponding to each group from wells corresponding to the other remaining groups.

* * * * *